United States Patent [19]
Glenn et al.

[11] Patent Number: 5,907,677
[45] Date of Patent: May 25, 1999

[54] METHOD FOR ESTABLISHING ANONYMOUS COMMUNICATION LINKS

[75] Inventors: Steve Glenn, Santa Monica; William Tod Gross, Pasadena; John Richard McRae, Tarzana, all of Calif.; Philip Malcolm Neches, Murray Hill; James Francis Day, Colts Neck, both of N.J.; Herbert Mortimer Zydney, Longboat Key, Fla.

[73] Assignee: Ecall Inc., Hoboken, N.J.

[21] Appl. No.: 08/702,833

[22] Filed: Aug. 23, 1996

[51] Int. Cl.⁶ ............................. G06F 13/00; H04L 12/22
[52] U.S. Cl. ................. 395/200.36; 379/204; 345/330; 395/200.56; 395/200.33
[58] Field of Search ................... 395/200.56, 200.02, 395/500, 881, 200.33, 210.56; 340/825.79, 825.54; 379/201, 90.01, 67.93, 67.1, 88.26, 88.21, 88.23; 380/25, 21; 314/DIG. 1, DIG. 2, 474.01; 348/13; 370/352; 701/1; 345/353

[56] References Cited

U.S. PATENT DOCUMENTS

| | | | |
|---|---|---|---|
| 4,847,890 | 7/1989 | Solomon et al. | 379/88.21 |
| 4,878,239 | 10/1989 | Solomon et al. | 379/88.23 |
| 5,017,917 | 5/1991 | Fisher et al. | 340/825.79 |
| 5,058,152 | 10/1991 | Solomon et al. | 379/67.1 |
| 5,361,295 | 11/1994 | Solomon et al. | 379/67.1 |
| 5,604,803 | 2/1997 | Aziz | 380/25 |
| 5,608,786 | 3/1997 | Gordon | 370/352 |
| 5,623,536 | 4/1997 | Solomon et al. | 379/88 |
| 5,651,058 | 7/1997 | Hackett-Jones et al. | 379/201 |
| 5,668,953 | 9/1997 | Sloo | 701/1 |
| 5,694,163 | 12/1997 | Harrison | 348/13 |

OTHER PUBLICATIONS

Strizich, Martha, "Companywide online services", Macworld Jan. 1995 v12 n1 p. 122 (4).
"Look who's talking", Computer Letter, Jul. 29, 1996 v12 n25 p. 1 (6).
Berlind, David "Userland stays stuck on the tried and true", PC Week, Oct. 2, 1995 v12 n39, p. 80 (1).

Primary Examiner—Daniel H. Pan
Attorney, Agent, or Firm—Gibbons, Del Deo, Dolan, Griffinger & Vecchione; David P. Krivoshik

[57] ABSTRACT

A method for establishing anonymous communication links comprises the steps of: identifying a plurality of subscribers; assigning a code to each of the plurality of subscribers; accessing a proprietary directory of the subscribers containing the code of each of the plurality of subscribers; and connecting a first subscriber of the plurality of subscribers to a second subscriber of the plurality of subscribers for communications. The first subscriber is identified by a first code so that the first subscriber can communicate with the second subscriber anonymously.

21 Claims, 2 Drawing Sheets

METHOD FOR ESTABLISHING ANONYMOUS COMMUNICATION LINKS

FIELD OF THE INVENTION

This invention relates to the field of telecommunications, and more particularly to anonymous telecommunication links.

BACKGROUND OF THE INVENTION

Because the Internet evolved from the ARPAnet, a research experiment that supported the exchange of data between government contractors and (often academic) researchers, an on-line culture developed that is alien to the corporate business world. The Internet was not designed to make commercialization easy.

Transaction Control Protocol/Internet Protocol (TCP/IP) is the communications standard between hosts on the Internet. TCP/IP defines the basic format of the digital data packets on the Internet allowing programs to exchange information with other hosts on the Internet.

Domain names direct where e-mail is sent, files are found, and computer resources are located. They are used when accessing information on the WWW or connecting to other computers through Telenet. Internet users enter the domain name, which is automatically converted to the Internet Protocol address by the Domain Name System (DNS). The DNS is a service provided by TCP/IP that translates the symbolic name into an IP address by looking up the domain name in a database.

The World Wide Web (WWW) is one of the newest Internet services. The WWW allows a user to access a universe of information which combines text, audio, graphics and animation within a hypermedia document. Links are contained within a WWW document which allows simple and rapid access to related documents. The WWW was developed to provide researchers with a system that would enable them to quickly access all types of information with a common interface, removing the necessity to execute a variety of numerous steps to access the information. During 1991, the WWW was released for general usage with access to hypertext and UseNet news articles. Interfaces to WAIS, anonymous FTP, Telnet and Gopher were added. By the end of 1993 WWW browsers with easy to use interfaces had been developed for many different computer systems.

UseNet is a network of news groups on thousands of different topics which allow the on-line discussion through the posting of individual messages (articles) which can be read by participants. An article is similar to an e-mail message, having a header, message body and signature.

Internet Relay Chat (IRC) provides a network equivalent of an old telephone party line. IRC is accessed through an Internet connection. This permits the user to chat with users all over the world about hundreds of different subjects at any time. In a way, its as if the UseNet newsgroups were a live discussion rather than postings. The interactive nature of IRC with multiple users makes long, detailed chats difficult to maintain. IRC users may send private messages to each other as well as start a private chat with several users.

The first step in an IRC session is for the local user IRC Client to connect to the IRC Server. The IRC is a lot like a text-based conference call. On IRC, each individual conference is called a channel. There are several hundred channels on IRC with each channel loosely related to a subject matter. Every channel has a current topic which may be viewed to determine what is currently being discussed. When joining a channel, it's like walking into a room full of people talking to each other, sometimes with several conversations going on at once. In addition to chatting on a channel which is broadcast to everyone on that channel, IRC provides a way to enter into a private chat as well as send private notices. IRC basically allows anyone to join and participate, as individuals are not invited to join, resulting in a very crowded channel.

A number of Internet phone software products offer voice capabilities in real time over the Internet. Internet phoneware vendors typically provide their own directory servers, organized by topic as well as by name. Voice quality varies from moment to moment. Such variations are due to the processing delay that results from encoding and decoding the conversation as well as the inherent delay of the Internet, which varies according to the amount of traffic at any given time and the route through which the signal must travel.

Desire for private secure anonymous voice communications has evolved as a result of concern for personal security and privacy. Voice mail boxes accessed through a 900 telephone number can allow users to select a conversation and even reply without ever actually knowing the full identity of the individuals engaged in the conversation. However the 900 telephone number voice mail boxes are more analogous to e-mail and news group postings than to chat groups, as they do not provide interactive real time conversations.

Individuals within chat groups, news groups and even e-mail is frequently identified by nick names, handles or simply account names. In a non business environment, rarely is an individuals actual legal name posted or even known. Current events have shown the extreme value that is placed upon personal security and privacy. There are many reasons why a user wants to be able to post Usenet articles anonymously. They may want to post to a controversial group, or may not want their employer to know about their postings. An anonymous posting service protects the rights of any user to say whatever they want without fear of retribution. Once a user posts through such a service, they can receive replies from other users who do not know their identity.

Accordingly, there is a need for providing anonymous real time communication links for secure private conversations.

SUMMARY OF THE INVENTION

A method for establishing anonymous communication links is provided. The method comprises the steps of: identifying a plurality of subscribers; assigning a code to each of the plurality of subscribers; accessing a proprietary directory of the subscribers containing the code of each of the plurality of subscribers; and connecting a first subscriber of the plurality of subscribers to a second subscriber of the plurality of subscribers for communications. The first subscriber is identified by a first code so that the first subscriber can communicate with the second subscriber anonymously.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in connecting Internet users who are communicating over a Chat server such as IRC, as well as any of the numerous on-line services, and shall be described with respect to this application, the methods and apparatus disclosed here can be applied to other schemes for employing anonymous communications.

Figure 1:
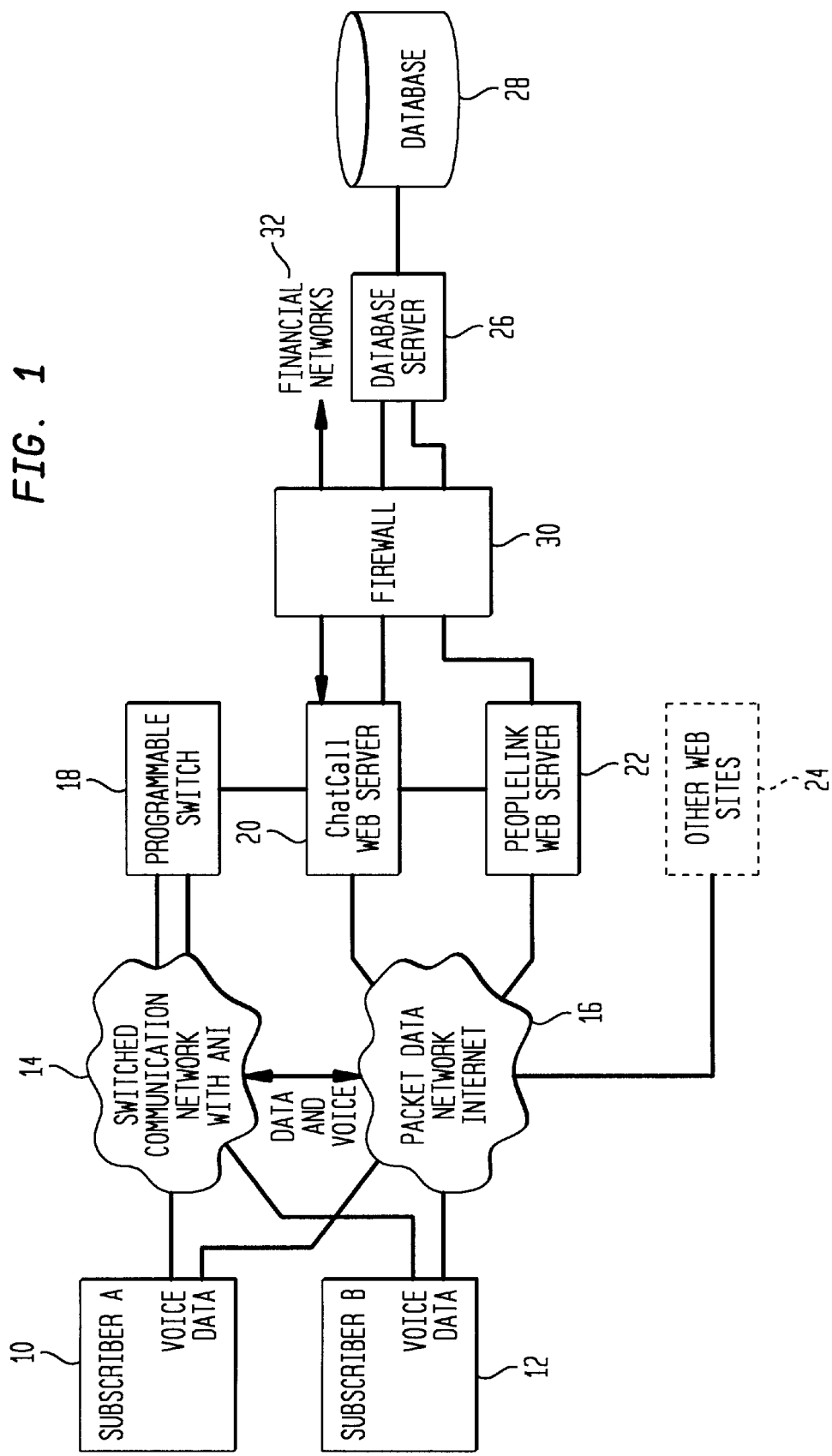
FIG. 1 is an overview of a communication/computer system network employing the present invention.

Referring to FIG. 1 there is shown a block diagram of a communication/computer system network employing the present invention method for establishing anonymous communication links. Subscriber A 10 and subscriber B 12 each have available a desktop or laptop personal computer and a switched telephone line. Although two telephone lines would typically provide the best experience, a single voice line or a voice line and LAN data connection can also be utilized. Subscriber A 10 and subscriber B 12, which represent a plurality of subscribers (at least two), have access to a switched communication network 14 with Automatic Number Identification (ANI) and a packet data network (Internet) 16. A programmable switch 18 has a plurality of connections (at least two) to the switched communication network 14. A ChatCall web server 20 is accessed through the packet data network 16 and is coupled to the programmable switch 18. A PeopleLink web server 22 is accessed through the packet data network 16 and is coupled to the ChatCall web server 20. Other web sites 24 are also accessed through the packet data network 16. A data base server 26 provides is coupled to a data base 28. The data base server 26 is coupled through a firewall 30 to the ChatCall web server 20 and to the PeopleLink web server 22. The ChatCall web server 20 accesses financial networks 32 through the firewall 30.

Figure 2:
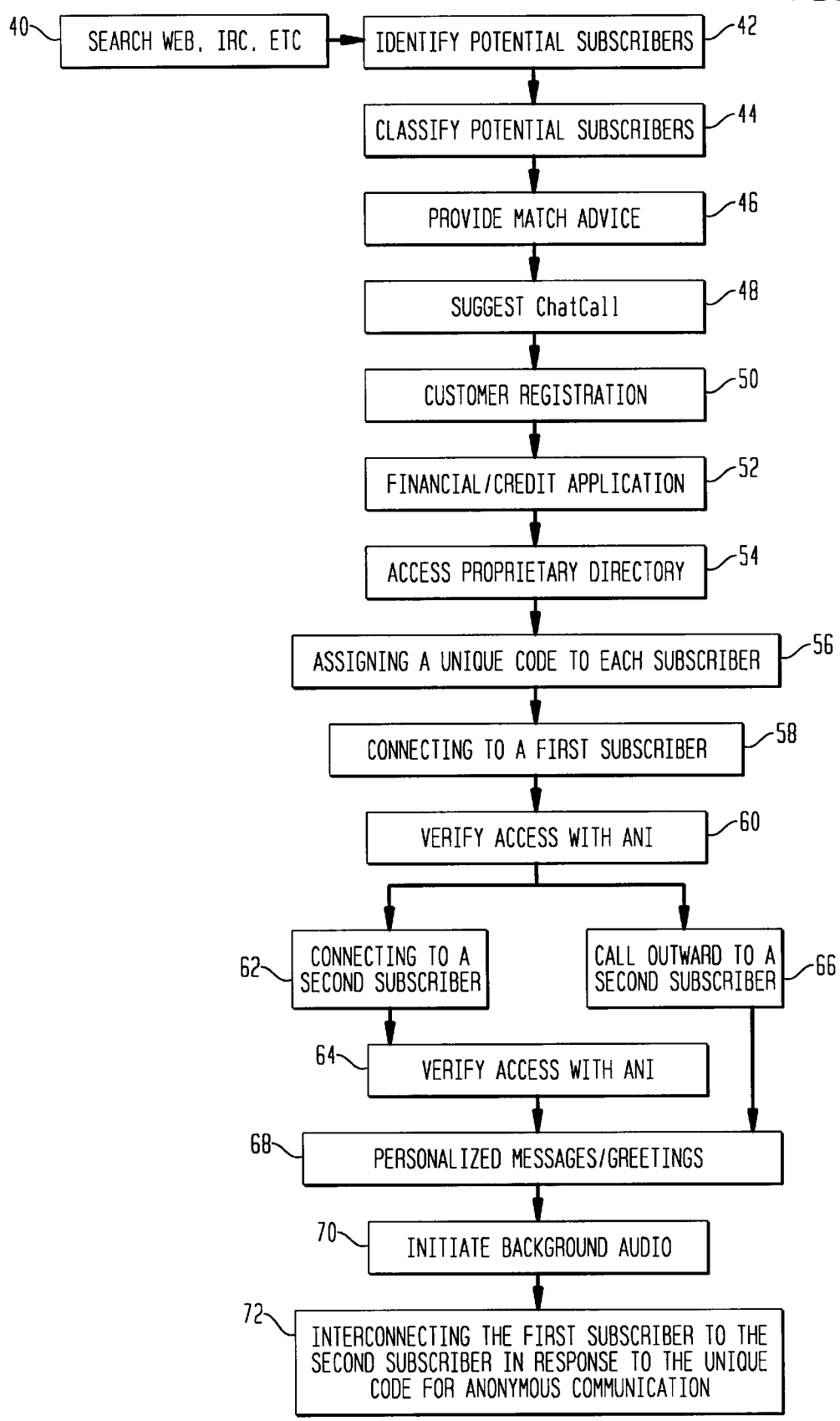
FIG. 2 is a high level flow chart of the anonymous link process.

Referring to FIG. 2 there is shown a high level flow chart of the anonymous link process. In step 40, a search of the Web, IRC, Home Pages and other data files is conducted. Potential subscribers are identified in step 42. Utilizing the information found in the data files and from other sources a potential subscriber is classified in step 44. In subsequent step 46 matching advice is provided. Then ChatCall is introduced and suggested to the potential subscriber in step 48. In step 50, for those that respond to utilize ChatCall registration is initiated. Next, in step 52 financial information is obtained and a credit application made. Access to a proprietary directory is made and updated in step 54. Each identified subscriber is assigned a unique code in step 56. This unique code is either computer selected or subscriber selected. A subscriber A 10, is connected in step 58 to a programmable switch 18 after dialing a toll free number. ANI of the switched communication network 14 is used to verify access by subscriber A 10 in step 60. In step 62 subscriber B 12 is connected to the programmable switch 18 after dialing the toll free number. ANI of the switched communication network 14 is used to verify access by subscriber B 12 in step 64. Alternatively to step 62 and 64, in step 66 a call is placed outward to subscriber B 12 by the programmable switch 18. In step 68, subscriber A 10 and subscriber B 12 receive personalized messages and greetings based upon information contained in the data base 28. Further, in step 70, based upon information contained in the data base 28, back ground audio. In step 72 subscriber A 10 and subscriber B 12 are interconnected in response to the unique code which establishes anonymous communications between them.

Referring back to FIG. 1, two parties, subscriber A 10 and subscriber B 12, access a chat group on a chat server such as PeopleLink 22 or other web sites 24 and desire to "meet" by telephone but without exchanging telephone numbers to each other because of privacy and security concerns. One of the two parties, such as subscriber A 10, accesses the ChatCall web server 20 and obtains ChatCall codes for subsequently accessing a programmable switch 18. Billing information is obtained for use in a subsequent calling sequence. The billing can be by a credit card, Cybercash, or other form. Each ChatCall code is unique in the system (unique to an individual subscriber or unique with respect to a predetermined group of subscribers). The ChatCall codes are 6 to 10 digits long and are assigned by the ChatCall web server 20. (Shorter code lengths are more subject to hacker break-ins however the longer codes require more effort to enter.) The ChatCall codes can be variable length codes as requested by a subscriber. This allows the subscriber to select mnemonic codes that are meaningful to them. When a subscriber requests a code, the ChatCall web server 20 will determine if the code is unique and either confirm the selection or recommend a close alternative that is available. Due to the variable length of digits, the sequence can be terminated with the # or * key.

Subscriber A 10 then shares their ChatCall code with Subscriber B 12. To place the call, the two parties call a common toll free number for the server which connects them to the programmable switch 18. In response to system generated prompts the two parties enter the shared ChatCall code. The system matches the codes and the party paying for the call enters their unique subscriber number. The automatic number identification (ANI) of the switched communication network 14 is used to verify access, reduce fraud, and block problems such as an electronic stalker, etc. ANI may be linked to available data bases to provide additional information. Subscriber A 10 is then connected to subscriber B 12. Alternatively, subscriber B 12 can call the common toll free number which accesses the programmable switch 20, which can then optionally initiate a call outward to the subscriber A 10 if subscriber A 10 chooses this option and has provided their telephone number to the system.

In an exemplary embodiment, the programmable switch 18 is a non-blocking Time Division Multiplexed (TDM) switch such as a SummaFour switch which is well suited for interfacing to digital networks. The programmable switch 18 can contain a Unix processor call control structure which is well matched for interworking with real time telephony and the ChatCall web server 20.

The PeopleLink web server 22 provides the general subscription profile data base and searching and is coupled to a data base server 26 which maintains and provides access to the data base 28. A relational database architecture is particularly well suited for organizing the data base 28, as it allows quick access and matching on extensive multi-criteria searches, with arbitrary weighting by the user on any criteria, providing speed and flexibility in searching. The database shall manage the following information: subscriber billable customer name, ChatCall codes assigned to the subscriber, and personal preferences; administrative logs defining the sequence of adds and deletes for accounting, audit and recovery; system logs of traffic and performance and variable threshold triggers to detect excessive queues for ChatCall call in requests, Internet communication queue, call origination queue and audio server queue. Reports are provided which include: number of ChatCalls in progress; number of reserved ChatCall capacity not in use; number of abandonments before billing either subscriber A 10 or subscriber B 12; capacity requirements; subscribers in database including active and inactive; and other information.

Information for the data base 28 is obtained from subscriber supplied information (such as completing a form on a Web page) as well as other sources. A custom parser, filter and automatic characteristic feature extractor (Note Crawler) reviews e-mail and newsgroup messages. Note Crawler extracts information for the database to create on-line user profiles based on interests as expressed in e-mail and postings in newsgroups. This is accomplished by analyzing discussion threads in the actual e-mail and message content.

An artificial intelligence-based/neural-network system performs fuzzy and expert matching utilizing a category hierarchy of traits and characteristics and allows qualitative and quantitative ranking on each scale. This information and feedback on the success of the matches is used to train the system to determine the patterns that optimize positive outcomes. Each new user input into the system improves it, eventually growing to provide expert-level recommendations to users about strong and interesting matches. Neural network technology is particularly well suited for this class of fuzzy matching.

Subscriber A 10 contacts the PeopleLink Web Server 22 and establishes a personal profile including information about their interests, beliefs and goals. The personal profile is maintained within the data base 28. The profile can include pictures and audio clips as well. Subscriber A 10 then receives a confirmation by e-mail along with information about local and national groups and events that are compatible with their interests and a summary of the number of people having similar profiles.

A subscriber A 10 or a visitor can now conduct searches of the database 28. The searches are presented in three formats. First, a general category search prompts subscribers through a series of category specific questions to determine their selection. Second, a free form search permits subscribers to define their own Boolean searches. Third, an artificial intelligence-based/neural-network system performs fuzzy and expert matching to automate the matching based upon information contained within the personal profiles. In response to the search request a subscriber will receive a report listing the subscribers identified in the search, their member profiles and the criteria by which they were selected. The report additionally indicates which subscribers are currently on-line in a PeopleLink chat service. Subscribers can respond to the subscribers listed in the report through e-mail. In order to maintain anonymity and security, e-mail replies are forwarded through the PeopleLink web server 22. Thus subscribers can maintain anonymous correspondence for as long as they decide.

A subscriber on-line in a PeopleLink chat service can optionally be notified when subscribers are on-line who match the searches that they previously performed and saved as well as when conversations that are of interest are going on. The notification is available at all times, running in the background. Notification can be done by interests, locations, topics of discussion, and other selection criteria. Further, when subscribers having very similar personal profiles are on-line at the same time, the group of subscribers can be notified and given an opportunity to meet each other by inviting them to join in. Small conference chat groups can be established and monitored.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for establishing anonymous communication links comprising the steps of:

identifying a plurality of subscribers;

assigning a code to each of said plurality of subscribers;

accessing a directory of said subscribers containing said code and a personal profile for each of said plurality of subscribers wherein a first subscriber of said plurality of subscribers and a second subscriber of said plurality of subscribers are matched in response to a first personal profile of said first subscriber and a second personal profile of said second subscriber; and interconnecting said first subscriber to said second subscriber for communications;

wherein said first subscriber is identified by a first code so that said first subscriber communicates interactively in real time anonymously and privately with said second subscriber, said interconnection of said first subscriber to said second subscriber is initiated in response to said first subscriber entering in said first code and said second subscriber entering a second code into a programmable switch.

2. The method as recited in claim 1 further comprising the step of classifying each of said plurality of subscribers.

3. The method as recited in claim 1 wherein said code is a unique code.

4. The method as recited in claim 1 wherein said code is unique to a group of said plurality of subscribers.

5. The method as recited in claim 1 wherein said communications comprises voice communications.

6. The method as recited in claim 1 wherein said communications comprises video communications.

7. The method as recited in claim 1 wherein said first subscriber and said second subscriber are connected in response to information in said directory.

8. The method as recited in claim 1 further comprising greeting said first subscriber and said second subscriber based upon information in said directory.

9. The method as recited in claim 1 wherein said first subscriber is matched to a subset of said plurality of subscribers which share personal profile information.

10. The method as recited in claim 1 wherein said connection of said first subscriber to said second subscriber is initiated in response a predetermined stimuli such that to a programmable switch establishes a connection to said first subscriber and said second subscriber.

11. The method as recited in claim 1 wherein said communications is established over a digital packet network.

12. The method as recited in claim 1 wherein at least one additional subscriber is connected with said first subscriber and said second subscriber while said first subscriber is connected to said second subscriber.

13. The method as recited in claim 1 further comprising notifying said first subscriber when a predetermined subscriber is on-line on a network.

14. The method as recited in claim 13 further comprising selecting said predetermined subscriber in response to said personal profile.

15. The method as recited in claim 13 further comprising selecting said predetermined subscriber in response to a user identification.

16. The method as recited in claim 13 wherein the step of notifying is made over said network.

17. The method as recited in claim 13 wherein said notification is made over a wide area switched network.

18. The method as recited in claim 1 wherein said second subscriber is selected in response to an external criteria and matched with said first subscriber.

19. The method as recited in claim 1 wherein said first subscriber and other subscribers are matched in response to a first personal profile of said first subscriber and a personal profile said other subscriber.

20. The method as recited in claim 19 further comprising the step of inviting each of said other subscribers to be connected with said first subscriber.

21. The method as recited in claim 1 further comprising the step of soliciting said subscribers to determine which of said subscribers wish to communicate anonymously and privately with another of said subscribers, or a select group of said subscribers, on one or more topics of mutual interest.

* * * * *